United States Patent [19]

Kawaratani et al.

[11] Patent Number: 5,075,064
[45] Date of Patent: Dec. 24, 1991

[54] METHOD AND APPARATUS FOR CONTINUOUSLY PRODUCING RESIN FILMS AND INSTALLATION THEREFOR

[75] Inventors: Haruo Kawaratani; Tetsuo Yoshioka, both of Ohtsu, Japan

[73] Assignee: Kanegafuchi Kagaku Kogyo Kabushiki Kaisha, Osaka, Japan

[21] Appl. No.: 493,316

[22] Filed: Mar. 14, 1990

[30] Foreign Application Priority Data

Mar. 14, 1989 [JP] Japan .................................. 1-62838

[51] Int. Cl.⁵ .............................................. B29C 41/50
[52] U.S. Cl. ................................... 264/205; 264/216; 264/345; 425/74; 425/75; 425/224
[58] Field of Search ............... 264/216, 212, 345, 169, 264/204, 205; 425/224, 74, 75, 445

[56] References Cited

U.S. PATENT DOCUMENTS

| | | | |
|---|---|---|---|
| 2,201,747 | 5/1940 | Staudt | 425/75 |
| 2,221,019 | 11/1940 | Clarke | 425/224 |
| 2,241,225 | 5/1941 | Talbot | 425/75 |
| 2,327,765 | 8/1943 | Carver | 425/75 |
| 2,434,231 | 1/1948 | Seitz | 425/224 |
| 2,688,155 | 9/1954 | Nadeau et al. | 425/74 |
| 3,734,984 | 5/1973 | Hoffman | 425/224 |
| 3,737,509 | 6/1973 | Kobayashi et al. | 264/212 |
| 4,342,718 | 8/1982 | Caratsch | 425/445 |
| 4,473,523 | 9/1984 | Sasaki et al. | 264/204 |
| 4,664,859 | 5/1987 | Knoop | 264/169 |

FOREIGN PATENT DOCUMENTS

| | | | |
|---|---|---|---|
| 1943216 | 3/1971 | Fed. Rep. of Germany | 425/224 |
| 55-137924 | 10/1980 | Japan | 264/216 |
| 724347 | 3/1980 | U.S.S.R. | 264/216 |

Primary Examiner—Jeffery Thurlow
Attorney, Agent, or Firm—Cushman, Darby & Cushman

[57] ABSTRACT

For continuous production of a resin film having a plain surface, a resin solution cast in film form over an endless belt is pre-hardened by a gas stream supplied for flow in a direction generally parallel to the surface of the endless belt, and then a jet of gas is blown in the direction of movement of the endless belt whereby the resin is hardened. In the process for resin film production wherein the resin film is cast over the endless belt and then pre-hardened by a parallel gas stream, the cast film being then hardened by a jet of gas, the installation for production is divided by partitions so as to enable various stages to be operated independently.

6 Claims, 1 Drawing Sheet

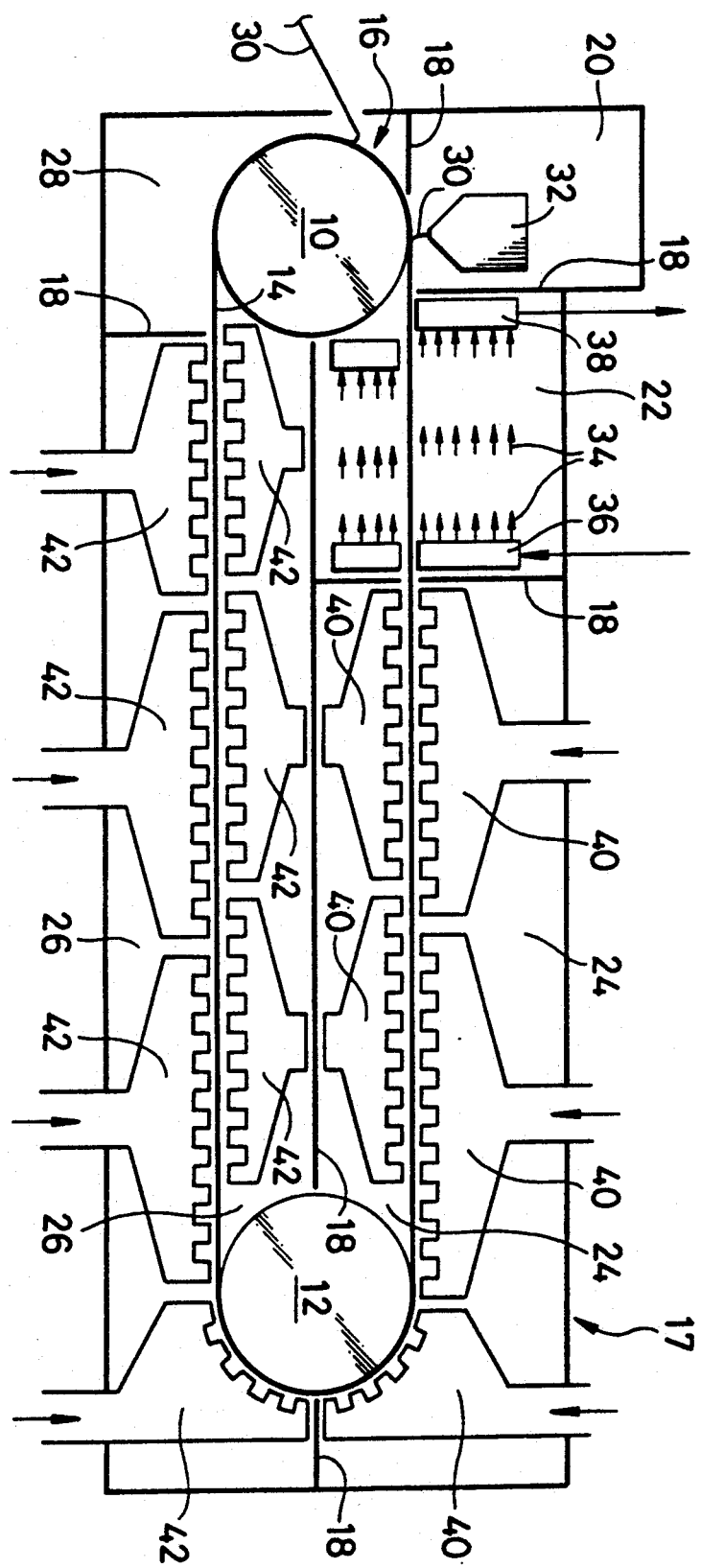

METHOD AND APPARATUS FOR CONTINUOUSLY PRODUCING RESIN FILMS AND INSTALLATION THEREFOR

BACKGROUND OF THE INVENTION

This invention relates to a method and apparatus for continuously producing resin films and also to an installation therefor.

Hitherto, resin films have been produced by casting a resin solution in film form over a casting drum through extrusion or coating, or casting the resin solution likewise over an endless belt in order to allow it to set and become hardened, then blowing hot air onto the film-form cast resin to allow the cast resin to become hardened to a self-supportable level, and subsequently separating the film-form resin from the casting drum or endless belt.

However, when hot air as blown in a jet stream through a nozzle or the like is applied to the surface of the film-form resin solution cast over the endless belt or the like surface, the surface of the resin film is often subject to the trouble of wind ripples being formed thereon under the force of the hot air, even if the resin solution is of high viscosity of, for example, 100 to 1000 poise. Another problem is that when hot air is blown through a nozzle onto the resin film cast over the endless belt, the cast resin film is subject to temperature irregularity in the transverse direction thereof because of the endless belt is continuously moving, with the result that no uniformity can be obtained in setting and hardening speed, surface irregularity being thus caused to the resin film. Such wind ripples and surface irregularity due to temperature unevenness will pose no problem in case where the resin film is used for foodstuff wrapping or the like purposes, but where it is used with electronic parts and the like, it will affect the electromagnetic characteristics of those parts.

The pulleys over which the endless belt is trained are heated by the hot air blown for setting and hardening the cast resin and accordingly the temperature of the endless belt itself is high because of heat transfer from the heated pulleys. Therefore, when a resin solution of, for example, the reactive setting type is cast in film form, setting and drying will occur with the film form resin simultaneously in parallel and randomly. This has made it difficult to control both the setting reaction speed and drying speed of the resin.

BRIEF SUMMARY

The object of this invention is to provide a novel method for continuously producing a resin film having a plain surface in a steady and efficient manner, and an apparatus and installation for carrying out the method.

According to the invention, there is provided a method for continuously producing a resin film which comprises: (a) a casting stage for continuously extruding or coating a resin solution in film form for casting it over an endlessly rotating plain surface, (b) a parallel-stream hardening stage for pre-hardening the cast resin film by heating and exposing it to a gas stream fed in a direction substantially parallel to the resin film, (c) a jet hardening stage or stages for hardening the pre-hardened resin film from the parallel-stream hardening stage by heating and exposing it to a jet of gas blown toward the resin film thereby to harden the resin film at least to a self-supporting level, and (d) a separation stage for separating from the plain surface the resin film which has passed through the jet hardening stage.

In such method for continuously producing a resin film, the endlessly rotating surface is an endless belt or casting drum.

In such method for continuously producing a resin film, the gas stream by which the resin film is heated and which is fed in a direction substantially parallel to the resin film in the parallel-stream hardening stage is a hot air stream.

According to the invention, there is provided an apparatus for continuously producing a resin film according to the above method, the apparatus comprising: (a) casting and transport means including two pulleys and an endless belt coursed for continuous run between the two pulleys for casting a resin solution in film form over the endless belt and transporting same thereon, (b) parallel stream hardening means for heating the cast resin film and exposing it to a gas stream fed substantially parallel to the resin film to thereby harden the resin film to a non-fluid state, (c) one-stage or multistage jet hardening means for heating the resin film hardened to a non-fluid state and exposing it to a jet of gas blown toward the resin film thereby to harden the resin film to a self-supporting level, and (d) separating means for separating the resin film hardened to a self-supporting level from the endless belt.

According to the invention, there is also provided an apparatus for continuously producing a resin film including casting and transport means having two pulleys and an endless belt coursed for continuous run between the two pulleys for casting a resin solution in film form over the endless belt, the apparatus comprising the pulley disposed nearer to the casting means being provided with cooling means for cooling the pulley to thereby cool the endless belt.

Further, according to the invention, there is provided an installation for continuously producing a resin film wherein a resin solution is cast in film form over an endless belt coursed for continuous run between two pulleys, the cast resin film being hardened to a self-supporting level, the resin film being then separated from the endless belt, comprising: (a) a casting chamber for casting the resin solution in film form over the endless belt, (b) a parallel stream hardening chamber for heating the cast resin film and exposing it to a gas stream substantially parallel to the resin film thereby to harden the resin film at least to a non-fluid state, (c) a jet hardening chamber having one or more compartments for heating the resin film hardened to a non-fluid state and exposing it to a jet of gas blown toward the resin film at least to a self-supporting level, and (d) a separating chamber for separating the resin film hardened to a self-supporting level from the endless belt.

In such installation for continuously producing a resin film, a dehumidifying stream of gas having a dew point lower than the temperature of the resin solution is supplied into the casting chamber.

According to the invention, the resin solution cast in film form over the endless belt is transported to the next stage in which it is uniformly heated on the one hand, while on the other hand volatiles produced in the course of setting reaction of the resin and some organic solvent are caused to evaporate by the gas stream fed generally parallel to the surface of the resin film. After the resin film is pre-hardened in the parallel-stream hardening stage until it has lost its fluidity, the resin film is transported to the next stage, i.e., jet hardening stage.

In the jet hardening stage, the resin film hardened to such non-fluid state is heated continuously in a single stage or stepwise in a plurality of stages and is exposed to a jet of gas blown through a nozzle in a single stage or in a plurality of stages so that volatiles produced in the course of setting reaction of the resin and some organic solvent can be efficiently caused to evaporate. The resin film which has thus been hardened and dried to a self-supporting level is then transported to the separation stage in which it is separated from the endless belt and finally taken up as a product onto a roll or the like.

Of the pulleys over which the endless belt is trained, the one pulley disposed nearer to the casting means is provided with cooling means so that the endless belt can be cooled through the pulley to any desired temperature. Through this arrangement it is possible to prevent any abrupt setting reaction of the resin film cast over the endless belt and to control the setting reaction of the resin film. Further, it is possible to control to an optimum value the evaporation rate of volatiles produced in the course of setting reaction of the resin film as well as of organic solvent contained in the resin.

The installation for continuously producing a resin film is provided with partitions for dividing the installation into a plurality of chambers, including casting chamber, parallel-stream hardening chamber, one or more jet hardening chambers, and separation chamber, so that operations of the different stages can be carried out within separate chambers. Through this arrangement, the operating atmosphere can easily be adjusted to suit each stage. Operation in each stage is unlikely to be affected by operation in adjacent stages. The possibility of wind ripples being formed on the resin film surface is eliminated. Further, the arrangement facilitates the control of setting reaction of the resin film and the control of the rate of fly-off of volatiles produced in the course of such reaction and organic solvents.

According to the invention, the resin film cast over the endless belt is heated and hardened by a stream of gas fed in parallel relation thereto to the extent that the resin film no longer has fluidity; and then it is hardened through exposure to a jet of gas until it attains good self-supporting characteristics. Therefore, the resin film is not liable to wind ripples being formed on its surface and thus a resin film having a plain surface can be produced.

The endless belt on which a resin film is cast is pre-cooled to an optimum temperature. This enables easy control of resin setting reaction and also of evaporation of volatiles produced in the course of such reaction and organic solvent content of the resin for causing such substances to evaporate under optimum conditions.

Moreover, the resin film producing installation is provided with partitions for defining the individual operating chambers so as to enable various operations in various stages to be carried out in separate chambers. Therefore, resin film production can be carried out under optimum conditions through suitable stage-by-stage adjustment of operating atmosphere.

BRIEF DESCRIPTION OF THE DRAWING

The single FIGURE is a schematic diagram for explanation of the method, apparatus, and installation for continuously producing a resin film according to the invention.

DETAILED DESCRIPTION OF THE INVENTION

One embodiment of the invention will now be described in detail with reference to the drawing.

The single FIGURE is an explanatory diagram which shows general arrangement of the installation for continuously producing a resin film according to the invention. In the drawing, a transport unit 16 comprises pulleys 10 and 12, and an endless belt 14 trained over the pulleys 10, 12. The transport unit 16 is arranged in a space enclosed by outer walls 17 in such way that it extends through various chambers, including a casting chamber 20, a parallel-stream hardening chamber 22, a first jet hardening chamber 24, a second jet hardening chamber 26, and a separating chamber 28, which are separately defined by partitions 18 dividing the space interior of the outer walls 17.

The pulley 10 of the transport unit 16 is drivably rotated by a drive unit not shown so as to rotate, in conjunction with the driven pulley 12, the endless belt 14 trained over the pulleys 10, 12. In the interior of the pulley 10 is disposed a cooling water conduit not shown which serves as cooling means for the pulley 10. The temperature at which the pulley 10 is to be maintained is suitably selected according to the type of the resin film to be produced. For example, where polyamide is produced through cyclic reaction of polyamide acid in order to produce a polyamide film, the temperature of the pulley 10 is kept at about 50° C. That is, the temperature of the pulley 10 should be such that the pulley 10 can easily be heated up to a temperature suitable for accelerating the setting reaction of the resin solution cast in film form over the endless belt 14 and further such that at the temperature the resin solution cast over the endless belt 14 can easily start setting reaction but volatiles produced in conjunction with the reaction and organic solvents cannot easily fly off.

The driven pulley 12 is of such arrangement that its width is smaller than the width of the endless belt 14 and that bearings not shown in which the pulley 12 is rotatably supported at its ends are so fixed to the floor as to be shift-adjustable in the direction of travel of the endless belt 14. The bearings are separately shiftable relative to the endless belt 14 so that snaking of the endless belt 14 can be corrected by changing the tension of the endless belt 14 at both ends through the pulley 12. Since the width of the pulley 12 is smaller than that of the endless belt 14, corners of the pulley 12 at both ends act on the endless belt 14 to cause the endless belt 14 to stop snaking by merely adjusting the bearings.

The endless belt 14 is formed of stainless steel, aluminum alloy, or the like material, and its surface is polished to mirror surface to permit production of a plain resin film.

In the casting chamber 20 located adjacent the drive pulley 10 of the transport unit 16 there is provided a die 32 for extruding resin solution 30 into a film form of uniform thickness, with the arrangement that resins of the reaction setting type are mixed in a mixer and fed to the die 32. The die 32 is cooled to a low temperature in order to prevent the pot life (serviceable life) of mixed reaction setting type resins from lapsing away within the die 32. Therefore, the surface of the die 32 is liable to condensation. To avoid such condensation, a dehumidifying gas of a temperature lower than the dew point of the die 32 is fed into the casting chamber 20.

The resin film 30 cast in film form through extrusion over the endless belt 14 is of a viscosity range of 10 to 1000's poise. When the surface of the resin film 30 is exposed directly to a jet of gas, however, wind ripples are easily formed on the film surface and set as they are, even if the resin film 30 is of high viscosity, with the result that a resin film 30 bearing irregular marks on its surface is produced. According to the invention, therefore, resin film 30 cast over the endless belt 14 is transported to the parallel-stream hardening chamber 22 in which the resin film 30 is set and hardened in such a way that no wind ripple may be formed on the film surface.

The parallel-stream hardening chamber 22 is a chamber defined across the endless belt 14. In the parallel-stream hardening chamber 22 are disposed a blowing box 36 for blowing hot air 34 in a direction parallel to the surface of the resin film 30 (endless belt 14) and a suction box 38 for discharging outward the hot air 34 blown from the blowing box 36 and volatiles evaporated from the resin film 30. Therefore, the resin film 30 is uniformly heated by the hot air 34 blown from the blowing box 36 and, at same time, evaporation of volatiles, etc. is accelerated by the parallel stream of air (34). Hot air 34 blown from the blowing box 36 may be of the following conditions, for example: 90° C. in temperature, and 1-5 m sec in velocity. It is noted, however, conditions may vary according to the type of the resin.

After the surface of the resin film 30 is set and hardened to non-fluid state, the resin film 30 is exposed to a jet of hot air by which it is hardened to a self-supporting level.

In the present embodiment, hardening of resin film 30 by a hot air jet is carried out in two stages. That is, hardening operation for resin film 30 is carried out in a first jet hardening chamber 24 and a second jet hardening chamber 26. The jet hardening chamber 24, 26 are defined by partition 18 in the endless belt 14 at inner and outer sides thereof. In each of the chambers 24, 26 there is disposed a jet hardening unit 40, 42 equipped with a multiplicity of nozzles through which hot air is blown in jets toward the surface of the resin film 30 (endless belt 14). The resin film 30 is heated at both sides by hot air blown from the jet hardening units 40, 42 directly to the resin film 30 (endless belt 14), and volatiles produced in the course of setting reaction of the resin and organic solvent components contained therein are efficiently evaporated by the jet stream. Thus, the resin film 30 is hardened to a self-supporting level.

The temperature and velocity of a jet stream blown from the jet hardening chamber 40, 42 are preferably raised as the resin film progressively become hardened. For example, a jet stream blown from the jet hardening unit 40 in the first jet hardening chamber 24 has a temperature of 100° C. and a velocity of 10 m/sec and a jet stream from the jet hardening unit 42 in the second jet hardening unit 42 has a temperature of 110° C. and a velocity of 12 m/sec. The temperature and velocity values shown above are merely exemplary and not restrictive.

The resin film 30 thus hardened on the endless belt 14 to a self-supporting level is transported to the separation chamber 28 in which it is stripped by a stripping roller not shown from the endless belt 14 and wound onto a roll. The endless belt 14 from which the resin film 30 is separated is cooled by the cooling means provided within the drive pulley 10 and is then employed for a next cycle of operation for production of resin film 30.

The endless belt 14 is already cooled through the pulley 10, so that when the resin solution (30) is cast in film form on the endless belt 14, the film form resin (30) is prevented from being momentarily heated to cause organic solvent and the like to evaporate from the surface of contact with the endless belt 14.

In this embodiment, as described above, the resin film cast on the endless belt is first set and hardened uniformly by a parallel stream of hot air to a non-fluid state, and then it is efficiently hardened by a jet of hot air to a self-supporting level. Therefore, the possibility of wind ripples being formed on the resin film surface is eliminated and thus a resin film having plain surface can be steadily produced. Moreover, each stage of operation is partitioned from adjacent stages so that operation can be carried out without disturbance from adjacent stages of operation. Thus, resin film production can be carried out in an optimum atmosphere and under optimum operation control.

One embodiment of the invention has been described above. It is noted, however, that the invention may be carried out in other forms.

For example, the parallel-stream hardening unit (36, 38) in the parallel-stream hardening chamber 22 may be disposed on the side facing the resin film 30 cast over the endless belt 14, while the jet hardening unit 40, 42 may be disposed on the side facing the endless belt 14. In that case, the surface of the resin film 30 is not liable to be exposed directly to air jet, there being thus no possibility of air ripples being formed.

The parallel-stream hardening unit may not be limited to one for hot air blowing. A heating source and a parallel stream source may be employed separately. For example, it is possible to employ an infrared or far-infrared generating unit to carry out uniform and steady heating of the resin film 30 cast over the endless belt 14 and, at the same time, to feed a stream of gas at ordinary temperatures in a direction parallel to the resin film 30. In this case, it is also possible to provide a stream of gas parallel to the resin film 30 through suction of the air within the parallel-stream hardening chamber and not by positive feed of air. The direction of flow of the parallel stream is not limited to a direction counter to the direction of movement of the endless belt 14; it may be same as the direction of movement of the endless belt 14 or a direction normal to the direction of movement of the endless belt 14.

Similarly, for the jet hardening unit, a heating source and a jet air may be employed separately.

One jet hardening chamber may be used instead of two. Treatment of the resin film by the jet hardening unit may be given one time only. It is also possible to provide a number of jet hardening chambers for step-by-step heating up, with a final stage for cooling. Again it is possible to arrange for feed of dehumidifying gas at a suitable location or locations so as to ensure that the resin film can be free from the adverse effect of condensation, within the installation, of gases evaporated from the resin.

The surface over which a resin solution is cast in film form through extrusion or coating and which is endlessly rotated is not limited to endless belt. It may be a casting drum having a reasonable radius of curvature. For resin solution casting, a coating method incorporating printing technique may be used as well as extruding technique. For pulley cooling, air cooling may be employed. This invention may be carried out in various modified, amended, or improved forms on the basis of the knowledge of any person skilled in the art and within the concept and spirit of the invention.

What is claimed is:

1. A method for continuously producing a resin film comprising the steps of:
    casting a resin solution over an endlessly rotating plain surface to form a cast resin film thereon;
    parallel-stream pre-hardening said cast resin film by heating and exposing said film to a gas stream fed in a direction substantially parallel to said film over the entire zone where said parallel-stream hardening step is performed;
    jet hardening said cast resin film, which has been parallel-stream hardened, by heating and exposing said film to a jet of gas blown toward said cast resin film over the entire zone where said jet hardening step is performed, thereby hardening said film at least to a self-supporting level; and
    separating said cast resin film which has been jet hardened from said plain surface.

2. A method for continuously casting a resin film as set forth in claim 1, wherein the endlessly rotating surface is an endless belt or casting drum.

3. A method for continuously casting a resin film as set forth in claim 1 or 2, wherein the gas stream by which the resin film is heated and which is fed in a direction substantially parallel to the resin film in the parallel-stream hardening stage is a hot air stream.

4. An apparatus for continuously producing a resin film comprising:
    casting and transport means including a casting chamber for extruding resin solution of uniform thickness over an endless belt which is transported by two pulleys in such a way that said endless belt is coursed for continuous run between the two pulleys and resin solution is continuously cast in film form over the endless belt and transported thereon;
    parallel stream hardening means including a parallel stream hardening chamber for heating the cast resin film and exposing said film to a gas stream fed substantially parallel to said film over the entire length of said endless belt passing through said parallel stream hardening chamber to thereby harden said film to a non-fluid state;
    one-stage or multistage jet hardening means including a jet hardening chamber or chambers for heating the resin film hardened to a non-fluid state and means of exposing said film to a jet of gas blown toward said film over the entire length of said endless belt passing through said jet hardening chamber, thereby to harden said film to a self-supporting level; and
    separating means including a separating chamber for separating the resin film hardened to a self-supporting level from said endless belt.

5. An installation for continuously producing a resin film wherein a resin solution is cast in film form over an endless belt coursed for continuous run between two pulleys, the cast resin film being hardened to a self-supporting level, the resin film being then separated from the endless belt, comprising:
    a casting chamber for casting the resin solution in film form over said endless belt in such a way that said endless belt is coursed for continuous run between said two pulleys;
    a parallel stream hardening chamber for heating the cast resin film and means for exposing said film to a gas stream fed substantially parallel to said film over the entire length of said endless belt passing through said parallel stream hardening chamber, thereby to harden said film at least to a non-fluid state;
    a jet hardening chamber having one or more compartments for heating the resin film hardened to a non-fluid state and means for exposing it to a jet of gas blown toward said film over the entire length of said endless belt passing through said jet hardening chamber, to thereby harden said film at least to a self-supporting level; and
    a separating chamber for separating the resin film hardened to a self-supporting level from said endless belt.

6. An installation for continuously producing a resin film as set forth in claim 5, wherein a dehumidifying stream of gas having a dew point lower than the temperature of the resin solution is supplied into the casting chamber.

* * * * *

UNITED STATES PATENT AND TRADEMARK OFFICE
CERTIFICATE OF CORRECTION

PATENT NO.  : 5,075,064
DATED       : December 24, 1991
INVENTOR(S) : KAWARATANI, Haruo; YOSHIOKA, Tetsuo It is certified that error appears in the above-identified patent and that said Letters Patent is hereby corrected as shown below:

Column 4,   line 27, change "polyamide" to --polyimide--; and line 29, change "polyamide" to --polyimide--.

Signed and Sealed this

Third Day of August, 1993

Attest:

MICHAEL K. KIRK

Attesting Officer

Acting Commissioner of Patents and Trademarks